US007925755B2

(12) United States Patent
Diep et al.

(10) Patent No.: US 7,925,755 B2
(45) Date of Patent: Apr. 12, 2011

(54) PEER TO PEER RESOURCE NEGOTIATION AND COORDINATION TO SATISFY A SERVICE LEVEL OBJECTIVE

(75) Inventors: Catherine Cuong Diep, Cupertino, CA (US); Lawrence Shun-mok Hsiung, Los Altos, CA (US); Luis Javier Ostdiek, San Jose, CA (US); Jayashree Subrahmonia, San Jose, CA (US); Noshir Cavas Wadia, Morgan Hill, CA (US); Peng Ye, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1869 days.

(21) Appl. No.: 11/028,123

(22) Filed: Dec. 30, 2004

(65) Prior Publication Data
US 2006/0149611 A1 Jul. 6, 2006

(51) Int. Cl.
G06F 15/173 (2006.01)
(52) U.S. Cl. ........................................ 709/226; 709/223
(58) Field of Classification Search .................. None
See application file for complete search history.

(56) References Cited

U.S. PATENT DOCUMENTS

| | | | | |
|---|---|---|---|---|
| 6,701,342 | B1 * | 3/2004 | Bartz et al. | 709/200 |
| 6,732,232 | B2 | 5/2004 | Krishnamurthy | |
| 6,745,221 | B1 | 6/2004 | Ronca | |
| 6,857,020 | B1 * | 2/2005 | Chaar et al. | 709/226 |
| 7,174,379 | B2 * | 2/2007 | Agarwal et al. | 709/226 |
| 2003/0050905 | A1 | 3/2003 | Mericas | |
| 2003/0120771 | A1 * | 6/2003 | Laye et al. | 709/224 |
| 2004/0111506 | A1 * | 6/2004 | Kundu et al. | 709/223 |
| 2004/0243699 | A1 * | 12/2004 | Koclanes et al. | 709/224 |

OTHER PUBLICATIONS

Frolund, S. et al "SoLOMon: Monitoring End-User Service Levels," May 1999, IEEE, pp. 261-274.*
Belokosztolszki, A., D.M. Eyers, P.R. Pietzuch, J. Bacon, and K. Moody, "Role-Based Access Control for Publish/Subscribe Middleware Architectures", *Proceedings of the $2^{nd}$ international workshop on Distributed Event-Based Systems*, 2003, pp. 1-8.
Chase, J.S., D.C. Anderson, P.N. Thakar, A.M. Vahdat, "Managing Energy and Server Resources in Hosting Centers", *Operating Systems Review*, vol. 35, No. 5, 2001, pp. 103-116.
Fu, Y., J. Chase, B. Chun, S. Schwab, and A. Vahdat, "Sharp: An Architecture for Secure Resource Peering", *Proceedings of the $19^{th}$ ACM Symposium on Operating System Principles*, 2003, pp. 133-148.
Seow, K.T., and K.Y. How, "Collaborative Assignment: A Multiagent Negotiation Approach Using BDI Concepts", *Proceedings of the $1^{st}$ international joint conference on Autonomous Agents and Multiagent Systems*, 2002, pp. 256-263.
Serban, R., C. Barakat, and W. Dabbous, "Dynamic Resource Allocation in Core Routers of a Diffserv Network", *Advances in Computing Science- ASIAN 2001*, 2002, pp. 153-167.
Wagner, R. (Ed.), "Proceedings: $22^{nd}$ International Conference on Distributed Computing Systems Workshops", ® 2002 IEEE.

* cited by examiner

*Primary Examiner* — Vivek Srivastava
*Assistant Examiner* — Azizul Choudhury
(74) *Attorney, Agent, or Firm* — Konrad Raynes & Victor LLP; Janaki K. Davda

(57) ABSTRACT

Techniques are provided for allocating resources. Performance metrics for a transaction are received. It is determined whether one or more service level objectives are being violated based on the received performance metrics. In response to determining that the one or more service level objectives are being violated, additional resources are allocated to the transaction. In response to allocating the additional resources, a resource allocation event is published.

18 Claims, 4 Drawing Sheets

PEER TO PEER RESOURCE NEGOTIATION AND COORDINATION TO SATISFY A SERVICE LEVEL OBJECTIVE

BACKGROUND

1. Field

Implementations of the invention relate to peer to peer resource negotiation and coordination to satisfy a service level objective.

2. Description of the Related Art

A service level objective may be described as a specification of a metric that is associated with both breach values for peak and off-peak hours in a schedule and a guaranteed level of service that is defined in a service level agreement (SLA). A SLA may be described as a contract between a customer and a service provider that specifies the expectations for the level of service with respect to availability, performance, and other measurable objectives. A metric may be described as a measurement type where each resource that can be monitored for performance, availability, reliability, and other attributes has one or more metrics about which data is collected. Sample metrics include the amount of Random Access Memory (RAM) on a computer, the number of help desk calls made by a customer, the average Central Processing Unit (CPU) busy time for a server computer, and mean time to failure for a hardware device. A breach value may be described as the value at which a service level objective (SLO) is considered as not being met.

In conventional systems, satisfying a service level objective for a collection of long running transactions or workflows in an enterprise data center may mean that several independent resource providers each allocate a required amount of resources. A transaction may be described as a related set of tasks that accomplish a particular action (e.g., obtaining an account balance for a bank customer). A workflow may be described as set of interdependent tasks or a sequence of activities performed in accordance with the business processes of an enterprise. An enterprise may be described as a business organization (e.g., one or more establishments, divisions, plants, warehouses, etc. that form a business organization). A resource provider may be described as any entity that provides resources (e.g., a storage manager).

The need for the resources is usually sequential. That is, the first part of a transaction requires resource A from a first resource provider, then resource B from a second resource provider, and so forth to complete successfully while meeting the service level objectives. The resource providers are usually independent and allocate resources independently of each other. The amount of resources required for a transaction is both variable and not easily predictable, therefore, the service level objects are difficult to meet. Reacting to demand changes without coordination among the resource providers usually results in under allocation of resources that results in service level objectives being breached or over allocation of resources to ensure that the service level objectives are met.

Also, in some conventional systems, a collection of resources hosted by a resource provider may be shared by multiple transaction classes. A transaction class may be described as an interface class that defines the methods implemented by a business object and that an application may use. A business object may be described as a set of attributes that represent a business entity (e.g., Employee) and methods that operate on data (e.g., a create or update operation). Although there has been some work done to create control functions to manage and optimize the allocation of resources based on metrics local to one resource provider, there is a need in the art for optimizing the allocation of resources when multiple resource providers are involved in meeting a service level objective.

SUMMARY OF THE INVENTION

Provided are a method, article of manufacture, and system for allocating resources. Performance metrics for a transaction are received. It is determined whether one or more service level objectives are being violated based on the received performance metrics. In response to determining that the one or more service level objectives are being violated, additional resources are allocated to the transaction. In response to allocating the additional resources, a resource allocation event is published.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings which form a part hereof and which illustrate several implementations. It is understood that other implementations may be utilized and structural and operational changes may be made without departing from the scope of the invention.

An upstream resource provider controller may be described as providing resources prior to a downstream resource provider controller. With implementations of the invention, the upstream resource provider controller has knowledge that is used as the basis for forecasting the resource allocation needs of downstream resource provider controllers. The implementations use this knowledge to allow downstream resource provider controllers to proactively adjust resource allocation based on the knowledge provided by the upstream resource provider controller.

Figure 1:
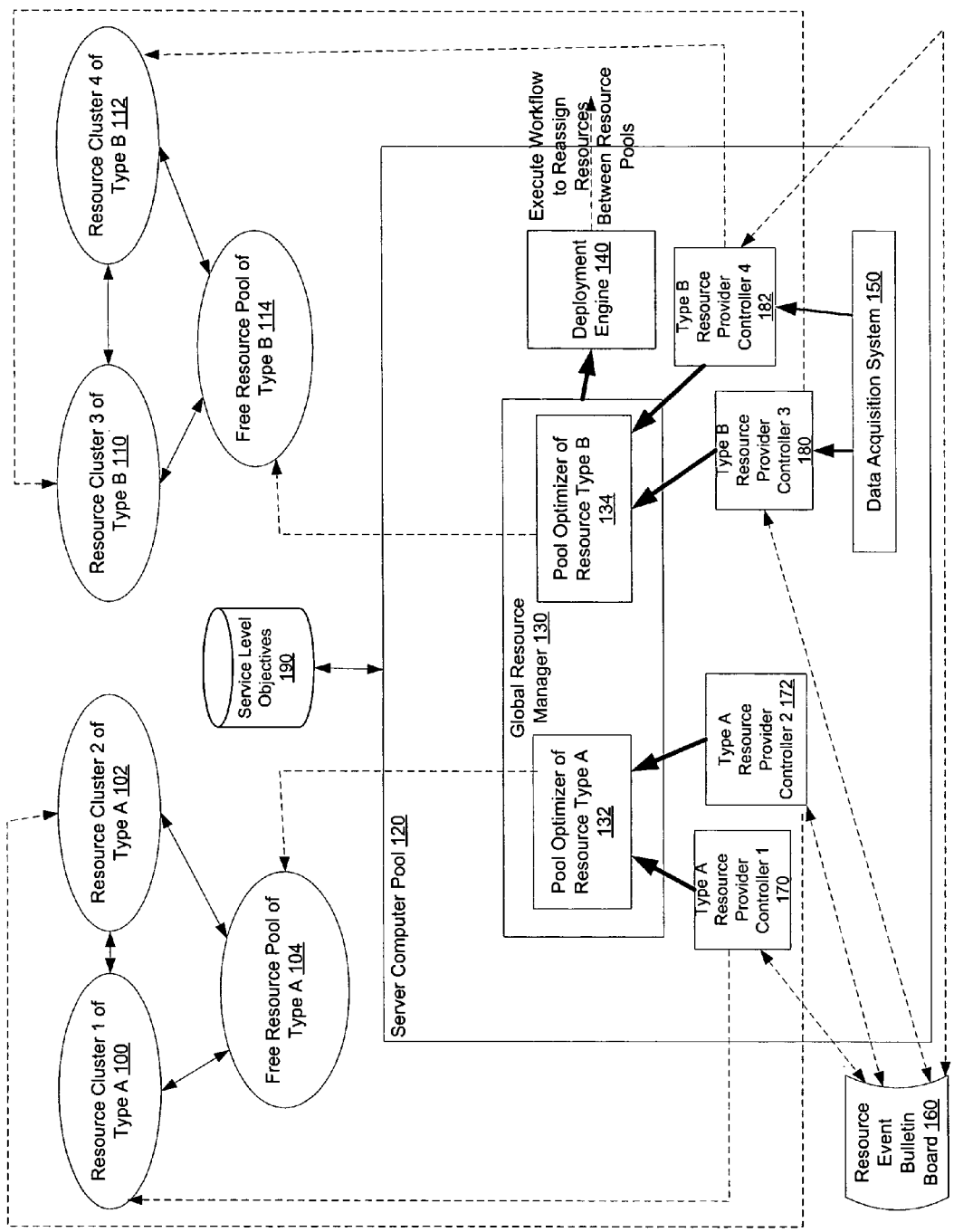
FIG. 1 illustrates details of a computer architecture in which certain implementations may be implemented.

FIG. 1 illustrates details of a computer architecture in which certain implementations may be implemented. A server computer pool 120 includes one or more server computers (not shown). The server computer pool 120 includes a global resource manager 130, a deployment engine 140, and a data acquisition system 150. The data acquisition system 150 collects metrics. The global resource manager 130 includes a pool optimizer of resource type A 132 and a pool optimizer of resource type B 134. The global resource manager 130 arbitrates resources between different requests. The server computer pool 120 is also coupled to a data store 190 storing service level objectives.

The server computer pool 120 also includes a type A resource provider controller 1 170, a type A resource provider controller 2 172, a type B resource provider controller 3 180, and a type B resource provider controller 4 182. A resource event bulletin board 160 enables posting of resource allocation events. A resource allocation event may be described as an event that occurs when there is a change in resource allocation. Each resource allocation event is associated with at least one event type. The resource provider controllers 170, 172, 180, 182 may be upstream or downstream of each other with respect to different transactions. For example, for a first transaction, resource provider controller 170 may be upstream relative to resource provider controller 180, while for a second transaction, resource provider controller 170 may be downstream relative to resource provider controller 180. The resource provider controllers 170, 172, 180, 182 may be described as being in a peer to peer relationship. Each resource provider controller 170, 172, 180, 182 may communicate with each other resource provider controller 170, 172, 180, 182 by issuing a resource allocation event. The nature of the peer to peer relationship is that a resource provider controller 170, 172, 180, 182 may either take actions based on the resource allocation event or may ignore the resource allocation event.

The resource clusters of type A 100, 102 and the resource clusters of type B 110, 112 are managed by separate resource provider controllers 170, 172, 180, and 182. In particular, resource cluster 1 of type A 100 is managed by type A resource provider controller 1 170; resource cluster 2 of type A 102 is managed by type A resource provider controller 2 172; resource cluster 3 of type B 110 is managed by type B resource provider controller 3 180; and, resource cluster 4 of type B 112 is managed by type B resource provider controller 4 182. Different resource clusters 100, 102, 110, 112 may be allocated to different transaction classes for an application or a group of resource clusters 100, 102, 110, 112 may be allocated to one transaction class. The resource provider controllers 170, 172, 180, 182 receive performance metrics of the server computer pool 120 from the data acquisition 150. Performance metrics may include, for example, transactions per second and response time. The resource provider controllers 170, 172, 180, 182 analyze the monitored data to detect trends and potential resource bottlenecks.

Figure 2:
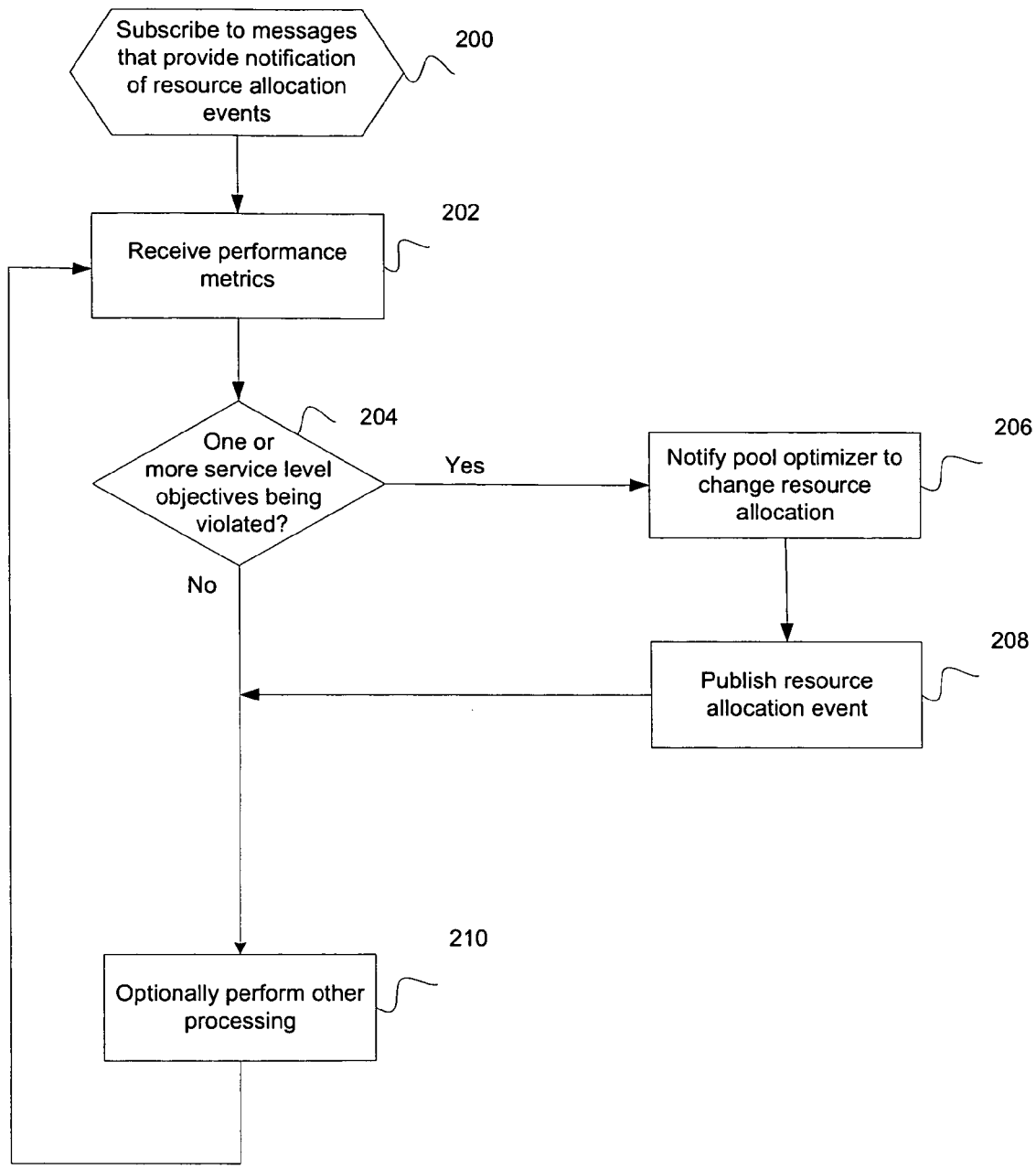
FIG. 2 illustrates logic for publishing a resource allocation event in accordance with certain implantations.

FIG. 2 illustrates logic for publishing a resource allocation event in accordance with certain implantations. Implementations of the invention are event based and publish-subscribe based. As for the publish-subscribe nature of implementations, each resource provider controller 170, 172, 180, 182 subscribes to messages that notify of resource allocation events (block 200). Each resource provider controller 170, 172, 180, 182 subscribes to messages from zero or more other resource provider controllers 170, 172, 180, 182. For example, if resource provider controller 170 is upstream of resource provider controller 180, then resource provider controller 170 may not subscribe to any messages, while the resource provider controller 180 subscribes to messages posted by resource provider controller 170.

During processing of a transaction, the resource provider controller 170, 172, 180, 182 receives performance metrics (block 202). In block 204, the resource provider controller 170, 172, 180, 182 determines whether one or more service level objects are being violated based on the received performance metrics. The service level objectives may be local to the resource provider controller 170, 172, 180, 182 and/or global to a transaction or workflow. The service level objectives may be stored as policies in a policy file or data store 190 coupled to the server computer pool 120. For example, if a performance metric shows that processing time for a particular task performed by a resource provider controller 170, 172, 180, 182 is one second, and the service level objective for the processing time is one millisecond (1 ms), then the service level objective is not being met (i.e., the service level objective is being violated), and the resource provider controller 170, 172, 180, 182 may allocate additional resources to try to meet the service level objective.

If the service level objectives are being violated, processing continues to block 206, otherwise, processing continues to block 210. In block 206, the resource provider controller 170, 172, 180, 182 notifies the appropriate pool optimizer 132, 134 to change the resource allocation. In particular, type A resource provider controllers 170, 172 would notify pool optimizer of resource type A 132, while type B resource provider controllers 180, 182 would notify pool optimizer of resource type B 134. The pool optimizer 132, 132 then notifies the deployment engine 140 to change the resource allocation. If the free resource pool of type a 104 does not have enough resources to change the resource allocation, additional resources may allocated from one free resource pool 104, 114 to another free resource pool 104, 114 or additional resources may be taken from one resource cluster of type A and transferred to another resource cluster of type A. In certain implementations, the deployment engine 140 executes a workflow to reassign resources between the resource pools 104, 114. In certain other implementations, the deployment engine 140 executes a workflow to allocate resources from one resource cluster of a same type to another resource cluster of the same type (e.g., by allocating the resources from the resource cluster to the free resource pool and then from the free resource pool to another resource cluster). Thus, resources from different resource clusters 100, 102, 110, 112 that have been allocated to different transaction classes may be allocated for one transaction of a particular transaction class. For example, resources from resource cluster of type A 102 may be allocated to a transaction that has already been allocated resources from resource cluster of type A 100. In block 208, the resource provider controller 170, 172, 180, 182 publishes a resource allocation event to the resource event bulletin board. In block 210, the resource provider controller 170, 172, 180, 182 optionally performs other processing and loops back to block 202. For example, the other processing may include processing a message that provides notification of a resource allocation event.

Thus, if a resource allocation change is made upstream, then the upstream resource provider controller 170, 172, 180, 182 publishes a resource allocation event. In particular, when an upstream resource provider controller 170, 172, 180, 182 adjusts the resource allocation for a defined transaction, the upstream resource provider controller 170, 172, 180, 182 generates a resource allocation event for that given transaction.

Figure 3:
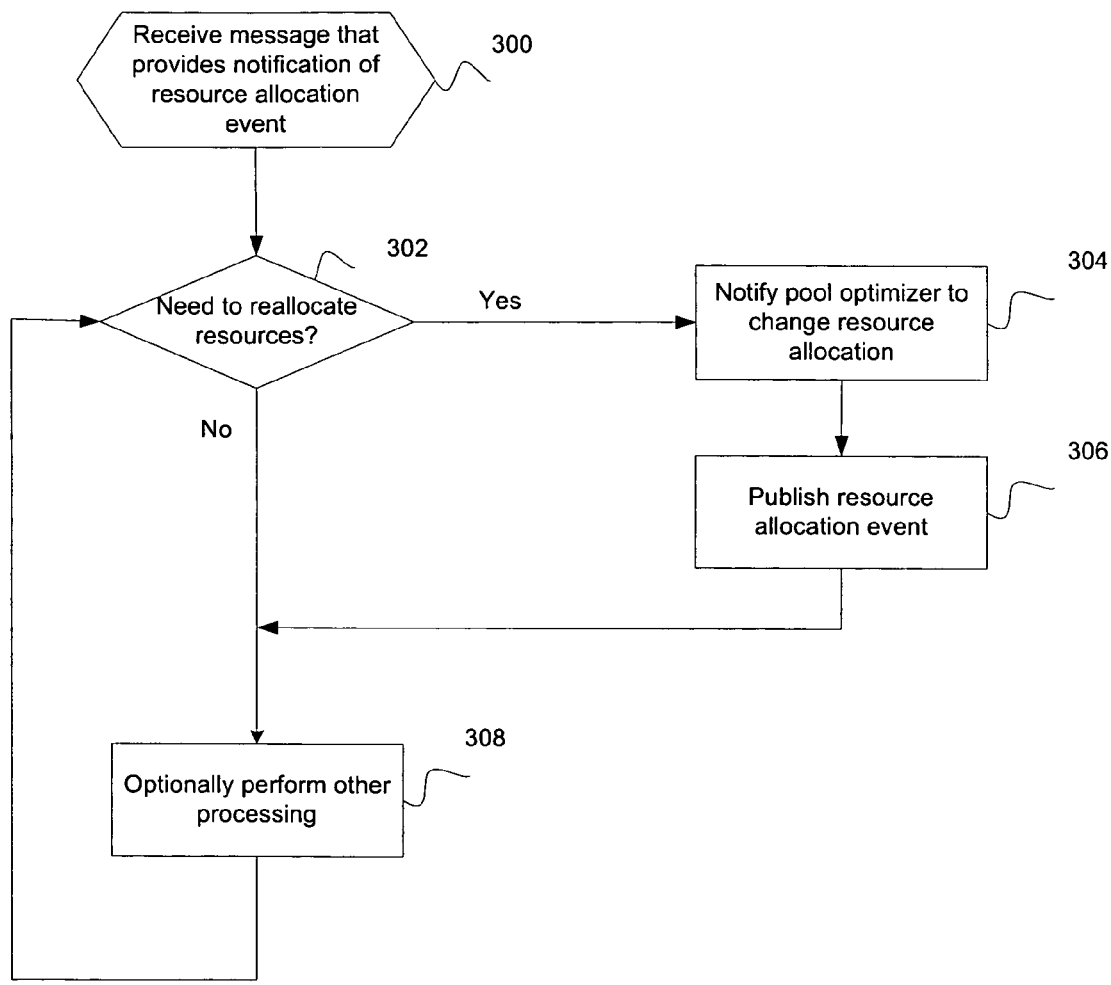
FIG. 3 illustrates logic for processing notification of a resource allocation event in accordance with certain implementations.

FIG. 3 illustrates logic for processing notification of a resource allocation event in accordance with certain implementations. Control begins at block 300 with the downstream resource provider controller 170, 172, 180, 182 receiving a message that provides notification of the resource allocation change. In block 302, the downstream resource provider controller 170, 172, 180, 182 determines whether a resource allocation change is required. For example, if the upstream resource provider controller 170, 172, 180, 182 increases storage space for the transaction, but the downstream resource provider controller 170, 172, 180, 182 had already allocated a large amount of storage space, the downstream resource provider controller 170, 172, 180, 182 may decide that the resource allocation does not need to be changed. If a resource allocation change is required, then processing continues to block 304, otherwise, processing continues to block 308.

In block 304, the downstream resource provider controller 170, 172, 180, 182 notifies the appropriate pool optimizer 132, 134 to change the resource allocation. The pool optimizer 132, 132 notifies the deployment engine 140 to change the resource allocation, and the deployment engine 140 executes a workflow to reassign resources between the resource pools 104, 114. Thus, the downstream resource provider controller 170, 172, 180, 182 may take proactive resource allocation actions. In particular, the downstream resource provider controllers 170, 172, 180, 182 may adjust their resource allocation based on the resource allocation performed by the upstream resource provider 170, 172, 180, 182.

In block 306, the downstream resource provider controller 170, 172, 180, 182 publishes a resource allocation event to the resource event bulletin board. This enables a resource provider controller 170, 172, 180, 182 that is downstream of the downstream resource provider controller 170, 172, 180, 182 to also adjust resource allocations as needed. In block 308, the resource provider controller 170, 172, 180, 182 optionally performs other processing and loops back to block 302.

To clarify implementations of the invention, an example is provided. In this example, type A resource provider controller 170 is upstream of type B resource provider controller 180, and which is upstream of type B resource provider controller 182. For this example, type A resource provider controller 172 is not utilized. Type a resource provider controller 170 determines that there is a surge of transaction volume of a certain transaction class and that there is an increased need for resources of resource type A from resource cluster 100. In this case, the type A resource provider controller 170 communicates with the pool optimizer of resource type A 132 to allocate more resources of type A from resource pool 104 to resource cluster 100 to handle the surge.

Continuing with the example, at the same time, the type A resource provider controller 170 is a publisher and publishes (i.e., posts) a resource allocation event on the resource event bulletin board 160. Then, the type B downstream resource provider controller 180 that subscribes to that event type receives a message that provides notification that a resource allocation event has been posted, and the notification describes the resource allocation event. The type B downstream resource provider controller 180 may allocate additional resources accordingly for type B resources before the surge hits the type B downstream resource provider controller 180. In particular, the type B downstream resource provider controller 180 communicates with the pool optimizer of resource type B 134 to allocate more resources of type B from resource pool 114 to resource cluster 110 to handle the surge.

As a publisher, the type B downstream resource provider controller 180 publishes a resource allocation event on the resource event bulletin board 160. Then, downstream resource provider controller 182 receives a message that provides notification that the resource allocation event has been posted, and the downstream resource provider controller 182 processes receipt of the message. Thus, the overall service level objective for the transaction class is preserved in a proactive fashion.

Thus, implementations introduce a new level of optimization using a peer-to-peer publish-subscribe resource negotiation model to communicate between the formerly independent resource provider controllers 170, 172, 180, 182 that manage separate but interrelated resource clusters 100, 102, 110, 112 by transaction classes. The negotiation allows actions taken by the resource provider controllers 170, 172, 180, 182 to be coordinated to achieve improved end-to-end performance and further reduces the chance of violating a transaction class service level objective.

The publish-subscribe based implementations are scalable and efficient to manage. Also, having the resource allocation and publish-subscribe based implementations leads to proactive solutions that lead to increased adherence to service level objectives and to efficient allocation of resources.

ADDITIONAL IMPLEMENTATION DETAILS

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2 and 3 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2 and 3 may be implemented in software, hardware, programmable and non-programmable gate array logic or in some combination of hardware, software, or gate array logic.

Figure 4:
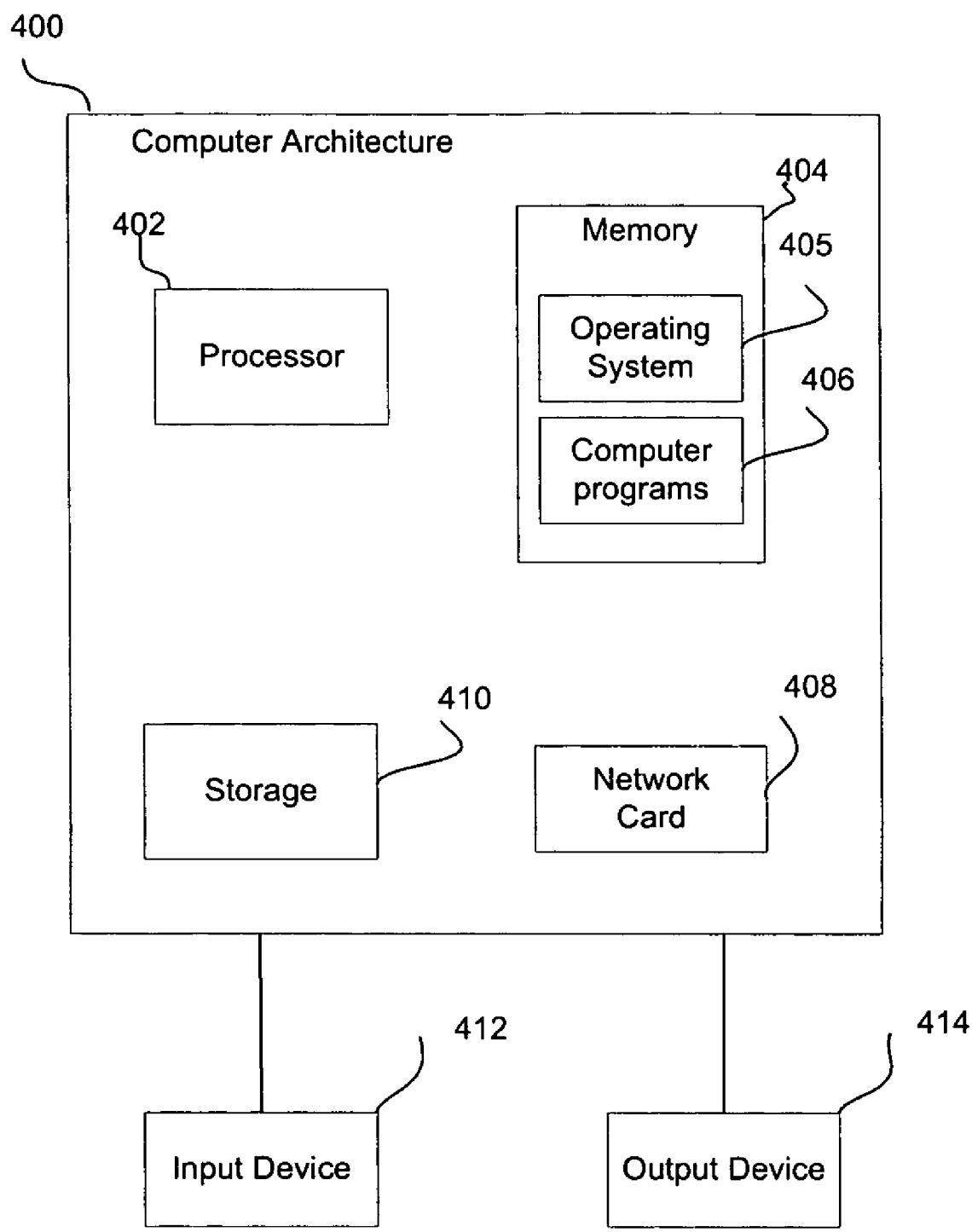
FIG. 4 illustrates an architecture of a computer system that may be used in accordance with certain implementations.

FIG. 4 illustrates an architecture 400 of a computer system that may be used in accordance with certain implementations. Server computer pool 120 may implement architecture 400. The computer architecture 400 may implement a processor 402 (e.g., a microprocessor), a memory 404 (e.g., a volatile memory device), and storage 410 (e.g., a non-volatile storage area, such as magnetic disk drives, optical disk drives, a tape drive, etc.). An operating system 405 may execute in memory 404. The storage 410 may comprise an internal storage device or an attached or network accessible storage. Computer programs 406 in storage 410 may be loaded into the memory 404 and executed by the processor 402 in a manner known in the art. The architecture further includes a network card 408 to enable communication with a network. An input device 412 is used to provide user input to the processor 402, and may include a keyboard, mouse, pen-stylus, microphone, touch sensitive display screen, or any other activation or input mechanism known in the art. An output device 414 is capable of rendering information from the processor 402, or other component, such as a display monitor, printer, storage, etc. The computer architecture 400 of the computer systems may include fewer components than illustrated, additional components not illustrated herein, or some combination of the components illustrated and additional components.

The computer architecture 400 may comprise any computing device known in the art, such as a mainframe, server, personal computer, workstation, laptop, handheld computer, telephony device, network appliance, virtualization device, storage controller, etc. Any processor 402 and operating system 405 known in the art may be used.

The foregoing description of implementations has been presented for the purposes of illustration and description. It is not intended to be exhaustive or to limit the implementations to the precise form disclosed. Many modifications and variations are possible in light of the above teaching. It is intended that the scope of the implementations be limited not by this detailed description, but rather by the claims appended hereto. The above specification, examples and data provide a complete description of the manufacture and use of the composition of the implementations. Since many implementations can be made without departing from the spirit and scope of the invention, the implementations reside in the claims hereinafter appended or any subsequently-filed claims, and their equivalents.

What is claimed is:

1. A method for allocating resources for a transaction, comprising:
    under control of a downstream resource provider controller on a computer having a processor,
        subscribing to at least one message posted on a resource event bulletin board by an upstream resource provider controller, wherein the messages notify the downstream resource provider controller of resource allocation events, wherein the resource allocation events occur when there is a change in resource allocation, wherein the downstream resource provider controller is downstream of the upstream resource provider controller for the transaction, and wherein the transaction sequentially uses resources from the upstream resource provider controller and the downstream resource provider controller;
    under control of the upstream resource provider controller on the computer,
        receiving performance metrics for a transaction;
        determining whether one or more service level objectives are being violated based on the received performance metrics;
        in response to determining that the one or more service level objectives are being violated, allocating additional resources to the transaction; and
        in response to allocating the additional resources, publishing a resource allocation event to the resource event bulletin board; and
    under control of the downstream resource provider controller,
        receiving a message that provides notification of the resource allocation event that indicates that there has been a resource allocation change by the upstream resource provider controller;
        determining whether resources are to be reallocated based on resource allocation performed by the upstream resource provider controller;
        in response to determining that resources are to be reallocated, allocating additional resources to the transaction based on the resource allocation performed by the upstream resource provider; and
        publishing a new resource allocation event, wherein another resource provider controller that provides resources for the transaction is downstream of the downstream resource provider controller and receives a message that provides notification of the resource allocation event that indicates that there has been a resource allocation change by the downstream resource provider controller.

2. The method of claim 1, wherein allocating additional resources further comprises:
    notifying a pool optimizer to allocate more resources to a resource cluster from a resource pool.

3. The method of claim 2, wherein the pool optimizer notifies a deployment engine to execute a workflow to reallocate resources.

4. The method of claim 1, wherein the upstream resource provider controller and the downstream resource provider controller are each associated with a resource cluster and a pool optimizer.

5. The method of claim 1, wherein publishing the resource allocation event enables peer to peer communication between the upstream resource provider controller and the downstream resource provider controller.

6. The method of claim 1, wherein allocating additional resources further comprises:
    allocating the additional resources from different resource clusters that have been allocated to different transaction classes.

7. An article of manufacture comprising a computer readable medium storing a program for allocating resources, wherein the program when executed by a processor on a computer causes operations to be performed, the operations comprising:
    under control of a downstream resource provider controller,
        subscribing to at least one message posted on a resource event bulletin board by an upstream resource provider controller, wherein the messages notify the downstream resource provider controller of resource allocation events, wherein the resource allocation events occur when there is a change in resource allocation, wherein the downstream resource provider controller is downstream of the upstream resource provider controller for the transaction, and wherein the transaction sequentially uses resources from the upstream resource provider controller and the downstream resource provider controller;
    under control of the upstream resource provider controller,
        receiving performance metrics for a transaction;
        determining whether one or more service level objectives are being violated based on the received performance metrics;

in response to determining that the one or more service level objectives are being violated, allocating additional resources to the transaction; and in response to allocating the additional resources, publishing a resource allocation event to the resource event bulletin board; and under control of the downstream resource provider controller, receiving a message that provides notification of the resource allocation event that indicates that there has been a resource allocation change by the upstream resource provider controller;

determining whether resources are to be reallocated based on resource allocation performed by the upstream resource provider controller;

in response to determining that resources are to be reallocated, allocating additional resources to the transaction based on the resource allocation performed by the upstream resource provider; and publishing a new resource allocation event, wherein another resource provider controller that provides resources for the transaction is downstream of the downstream resource provider controller and receives a message that provides notification of the resource allocation event that indicates that there has been a resource allocation change by the downstream resource provider controller.

8. The article of manufacture of claim 7, wherein the operation for allocating additional resources further comprises:

notifying a pool optimizer to allocate more resources to a resource cluster from a resource pool.

9. The article of manufacture of claim 8, wherein the pool optimizer notifies a deployment engine to execute a workflow to reallocate resources.

10. The article of manufacture of claim 7, wherein the upstream resource provider controller and the downstream resource provider controller are each associated with a resource cluster and a pool optimizer.

11. The article of manufacture of claim 7, wherein publishing the resource allocation event enables peer to peer communication between the upstream resource provider controller and the downstream resource provider controller.

12. The article of manufacture of claim 7, wherein the operation for allocating additional resources further comprises:

allocating the additional resources from different resource clusters that have been allocated to different transaction classes.

13. A system for allocating resources, comprising:

circuitry capable of causing operations to be performed, the operations comprising:

under control of a downstream resource provider controller, subscribing to at least one message posted on a resource event bulletin board by an upstream resource provider controller, wherein the messages notify the downstream resource provider controller of resource allocation events, wherein the resource allocation events occur when there is a change in resource allocation, wherein the downstream resource provider controller is downstream of the upstream resource provider controller for the transaction, and wherein the transaction sequentially uses resources from the upstream resource provider controller and the downstream resource provider controller;

under control of the upstream resource provider controller, receiving performance metrics for a transaction;

determining whether one or more service level objectives are being violated based on the received performance metrics;

in response to determining that the one or more service level objectives are being violated, allocating additional resources to the transaction; and in response to allocating the additional resources, publishing a resource allocation event to the resource event bulletin board; and under control of the downstream resource provider controller, receiving a message that provides notification of the resource allocation event that indicates that there has been a resource allocation change by the upstream resource provider controller;

determining whether resources are to be reallocated based on resource allocation performed by the upstream resource provider controller;

in response to determining that resources are to be reallocated, allocating additional resources to the transaction based on the resource allocation performed by the upstream resource provider; and publishing a new resource allocation event, wherein another resource provider controller that provides resources for the transaction is downstream of the downstream resource provider controller and receives a message that provides notification of the resource allocation event that indicates that there has been a resource allocation change by the downstream resource provider controller.

14. The system of claim 13, wherein the operation for allocating additional resources further comprises:

notifying a pool optimizer to allocate more resources to a resource cluster from a resource pool.

15. The system of claim 14, wherein the pool optimizer notifies a deployment engine to execute a workflow to reallocate resources.

16. The system of claim 13, wherein the upstream resource provider controller and the downstream resource provider controller are each associated with a resource cluster and a pool optimizer.

17. The system of claim 13, wherein publishing the resource allocation event enables peer to peer communication between the upstream resource provider controller and the downstream resource provider controller.

18. The system of claim 13, wherein allocating additional resources further comprises:

allocating the additional resources from different resource clusters that have been allocated to different transaction classes.

* * * * *